(12) United States Patent
Guo et al.

(10) Patent No.: US 12,095,932 B2
(45) Date of Patent: Sep. 17, 2024

(54) DIGITAL CERTIFICATE VERIFICATION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Rui Guo, Shenzhen (CN); Maocai Li, Shenzhen (CN); Jianjun Zhang, Shenzhen (CN); Zhen Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 216 days.

(21) Appl. No.: 16/997,868

(22) Filed: Aug. 19, 2020

(65) Prior Publication Data

US 2020/0382326 A1 Dec. 3, 2020

Related U.S. Application Data

(63) Continuation of application No. PCT/CN2019/092268, filed on Jun. 21, 2019.

(30) Foreign Application Priority Data

Jul. 24, 2018 (CN) .......................... 201810821667.6

(51) Int. Cl.
*H04L 9/32* (2006.01)
*H04L 9/00* (2022.01)
*H04L 9/06* (2006.01)

(52) U.S. Cl.
CPC .......... *H04L 9/3268* (2013.01); *H04L 9/0637* (2013.01); *H04L 9/3265* (2013.01); *H04L 9/50* (2022.05)

(58) Field of Classification Search
CPC ... H04L 9/3268; H04L 9/0637; H04L 9/3265; H04L 2209/38; H04L 63/0823; H04L 9/3239; H04L 9/3263; H04L 9/50
See application file for complete search history.

(56) References Cited

U.S. PATENT DOCUMENTS

2015/0244690 A1 8/2015 Mossbarger
2015/0371224 A1* 12/2015 Lingappa ............. G06Q 20/401
705/71

(Continued)

FOREIGN PATENT DOCUMENTS

CN 106301792 A 1/2017
CN 106372941 A 2/2017

(Continued)

OTHER PUBLICATIONS

The World Intellectual Property Organization (WIPO) International Search Report for PCT/CN2019/092268 Sep. 27, 2019 5 Pages (including translation).

(Continued)

*Primary Examiner* — Michael Simitoski
*Assistant Examiner* — Hany S. Gadalla
(74) *Attorney, Agent, or Firm* — ANOVA LAW GROUP, PLLC

(57) ABSTRACT

Embodiments of this application relate to a digital certificate verification method and apparatus, a computer device, and a storage medium. The digital certificate verification method is performed by a authentication center, and include receiving a verification request for verifying a target digital certificate; obtaining a target transaction record corresponding to the target digital certificate from a blockchain, the target digital certificate being stored in the blockchain as a transaction resource; obtaining a target account type corresponding to the target transaction record, different account types corresponding to different certificate operation states;

(Continued)

and determining a verification result corresponding to the target digital certificate according to the target account type.

19 Claims, 9 Drawing Sheets

(56) References Cited

U.S. PATENT DOCUMENTS

| | | | |
|---|---|---|---|
| 2017/0346639 A1* | 11/2017 | Muftic | H04L 9/3247 |
| 2018/0082291 A1 | 3/2018 | Allen et al. | |
| 2018/0137508 A1* | 5/2018 | Shah | G06Q 20/36 |
| 2018/0276666 A1* | 9/2018 | Haldenby | G06Q 20/10 |
| 2019/0036711 A1* | 1/2019 | Qiu | H04L 63/0823 |
| 2019/0068380 A1* | 2/2019 | Tang | A61M 5/172 |
| 2019/0238316 A1* | 8/2019 | Padmanabhan | H04L 67/1095 |
| 2019/0272537 A1* | 9/2019 | Miller | G06Q 20/389 |
| 2019/0312928 A1* | 10/2019 | D'Ercoli | H04L 67/1095 |
| 2020/0013050 A1* | 1/2020 | Finlow-Bates | H04L 9/3239 |
| 2020/0021439 A1* | 1/2020 | Sato | G06Q 20/401 |
| 2020/0027082 A1* | 1/2020 | Nakagawa | G06Q 20/389 |
| 2021/0036999 A1* | 2/2021 | Jin | H04L 63/126 |

FOREIGN PATENT DOCUMENTS

| | | | |
|---|---|---|---|
| CN | 106384236 A | 2/2017 | |
| CN | 106385315 A | 2/2017 | |
| CN | 106972931 A | 7/2017 | |
| CN | 107592293 A | 1/2018 | |
| CN | 108111314 A | 6/2018 | |
| CN | 108964924 A | 12/2018 | |
| CN | 109067543 A | 12/2018 | |
| KR | 20040039902 A | 5/2004 | |
| WO | WO-2018184485 A1 * | 10/2018 | H04L 29/06 |

OTHER PUBLICATIONS

The State Intellectual Property Office of the People's Republic of China (SIPO) Office Action 1 for 201810821667.6 Oct. 9, 2019 8 Pages (including translation).

Korean Intellectual Property Office (KIPO) Office Action 1 for 20207032738 Apr. 21, 2022 10 Pages (including translation).

\* cited by examiner

DIGITAL CERTIFICATE VERIFICATION METHOD AND APPARATUS, COMPUTER DEVICE, AND STORAGE MEDIUM

RELATED APPLICATIONS

This application claims priority to PCT Application No. PCT/CN2019/092268, filed on Jun. 21, 2019, which in turn claims priority to Chinese Patent Application No. 201810821667.6, entitled "DIGITAL CERTIFICATE VERIFICATION METHOD AND APPARATUS, COMPUTER DEVICE, AND STORAGE MEDIUM" and filed on Jul. 24, 2018. The two applications are both incorporated herein by reference in their entirety.

FIELD OF THE TECHNOLOGY

This application relates to the field of computer technologies, and in particular, to a digital certificate verification method and apparatus, a computer device, and a storage medium.

BACKGROUND OF THE DISCLOSURE

A digital certificate is a certificate file used for verifying the identity of a network node in a network. To verify the identity, the network node may apply for a digital certificate from a certificate authority (CA). The CA issues a digital certificate to the network node after performing identity certification.

Often, a digital certificate is verified by a CA that generates the certificate. If the CA is hijacked, a verification result obtained by verifying the digital certificate by the CA is unreliable, resulting in low network security.

SUMMARY

Embodiments of the present disclosure provide a digital certificate verification method and apparatus, a computer device, and a storage medium to address the foregoing problems. A corresponding target account type may be obtained according to a transaction record, recorded in a blockchain of a target digital certificate, and a verification result corresponding to the target digital certificate is determined according to the corresponding target account type. Because a digital certificate is stored in a blockchain as a transaction resource, a transaction record is not prone to tampering. Further, different account types correspond to different certificate operation states, a verification result obtained according to an account type in the transaction record in the blockchain has high reliability and high network security.

One aspect of the present disclosure provides a digital certificate verification method. The method includes receiving a verification request for verifying a target digital certificate; obtaining a target transaction record corresponding to the target digital certificate from a blockchain, the target digital certificate being stored in the blockchain as a transaction resource; obtaining a target account type corresponding to the target transaction record, different account types corresponding to different certificate operation states; and determining a verification result corresponding to the target digital certificate according to the target account type.

Another aspect of the present disclosure provides a digital certificate verification apparatus in an authentication center. The apparatus includes a verification request receiving module, configured to receive a verification request for verifying a target digital certificate; a target transaction record obtaining module, configured to obtain a target transaction record corresponding to the target digital certificate from a blockchain, the target digital certificate being stored in the blockchain as a transaction resource; a target account type obtaining module, configured to obtain a target account type corresponding to the target transaction record, different account types corresponding to different certificate operation states; and a verification result determination module, configured to determine a verification result corresponding to the target digital certificate according to the target account type.

Another aspect of the present disclosure provides a computer device, comprising a memory and a processor, the memory storing a computer program, the computer program, when executed by the processor, causing the processor to perform operations of the digital certificate verification method. The method includes receiving a verification request for verifying a target digital certificate; obtaining a target transaction record corresponding to the target digital certificate from a blockchain, the target digital certificate being stored in the blockchain as a transaction resource; obtaining a target account type corresponding to the target transaction record, different account types corresponding to different certificate operation states; and determining a verification result corresponding to the target digital certificate according to the target account type.

Another aspect of the present disclosure provides a non-transitory computer-readable storage medium that stores a computer program, the computer program, when executed by a processor, causing the processor to perform operations including: receiving a verification request for verifying a target digital certificate; obtaining a target transaction record corresponding to the target digital certificate from a blockchain, the target digital certificate being stored in the blockchain as a transaction resource; obtaining a target account type corresponding to the target transaction record, different account types corresponding to different certificate operation states; and determining a verification result corresponding to the target digital certificate according to the target account type.

DESCRIPTION OF EMBODIMENTS

To make objectives, technical solutions, and advantages of this application clearer and more understandable, this application is further described in detail below with reference to the accompanying drawings and the embodiments. It is to be understood that the specific embodiments described herein are merely used for explaining this application, and are not intended to limit this application.

It may be understood that the terms "first", "second" and the like used in this application may be used for describing various elements in this specification. However, the elements are not limited by the terms unless otherwise specified. The terms are merely used for distinguishing the first element from another element. For example, without departing from the scope of this application, a first transaction record may be referred to as a second transaction record, and similarly, the second transaction record may be referred to as the first transaction record.

Figure 1:
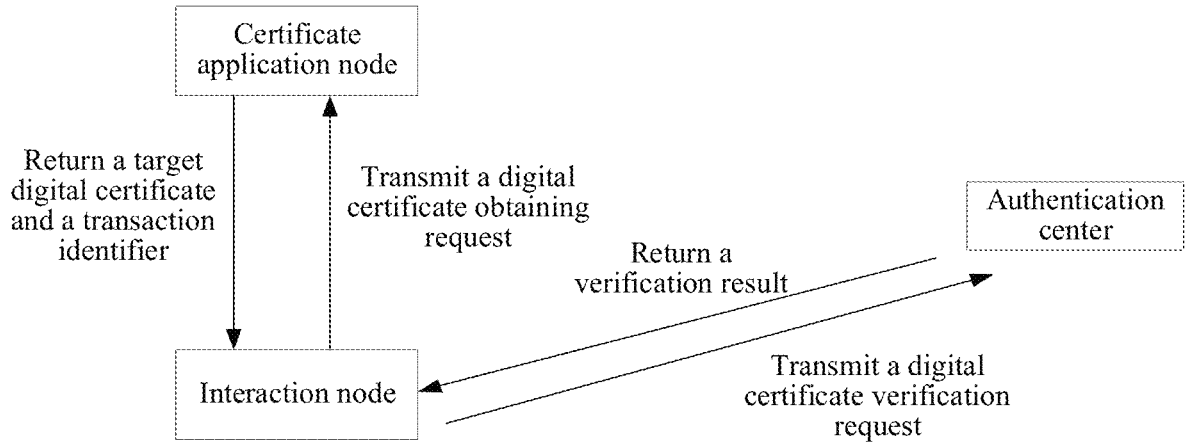
FIG. 1 is a diagram of an application environment of a digital certificate verification method according to an embodiment.

FIG. 1 is a diagram of an application environment of a digital certificate verification method according to an embodiment. As shown in FIG. 1, the application environment includes a certificate application node, an interaction node, and a authentication center. When interacting with the certificate application node, the interaction node transmits a digital certificate obtaining request to the certificate application node. The certificate application node returns a target digital certificate and a transaction identifier to the interaction node. The interaction node may transmit a verification request to the authentication center, the verification request carrying the transaction identifier and the target digital certificate. The authentication center performs the digital certificate verification method provided in this embodiment of this application, to obtain a verification result, and returns the verification result to the interaction node.

The interaction node may be connected to the certificate application node and the authentication center by a network. Each authentication center may be an independent physical server or terminal or may be a server cluster including a plurality of physical servers or may be a cloud server providing basic cloud computing services such as a cloud server service, a cloud database service, a cloud storage service, and a content delivery network (CDN) service. The certificate application node or the interaction node may be an independent physical server or terminal or may be a server cluster including a plurality of physical servers or may be a cloud server providing basic cloud computing services such as a cloud server service, a cloud database service, a cloud storage service, and a CDN service.

Figure 2:
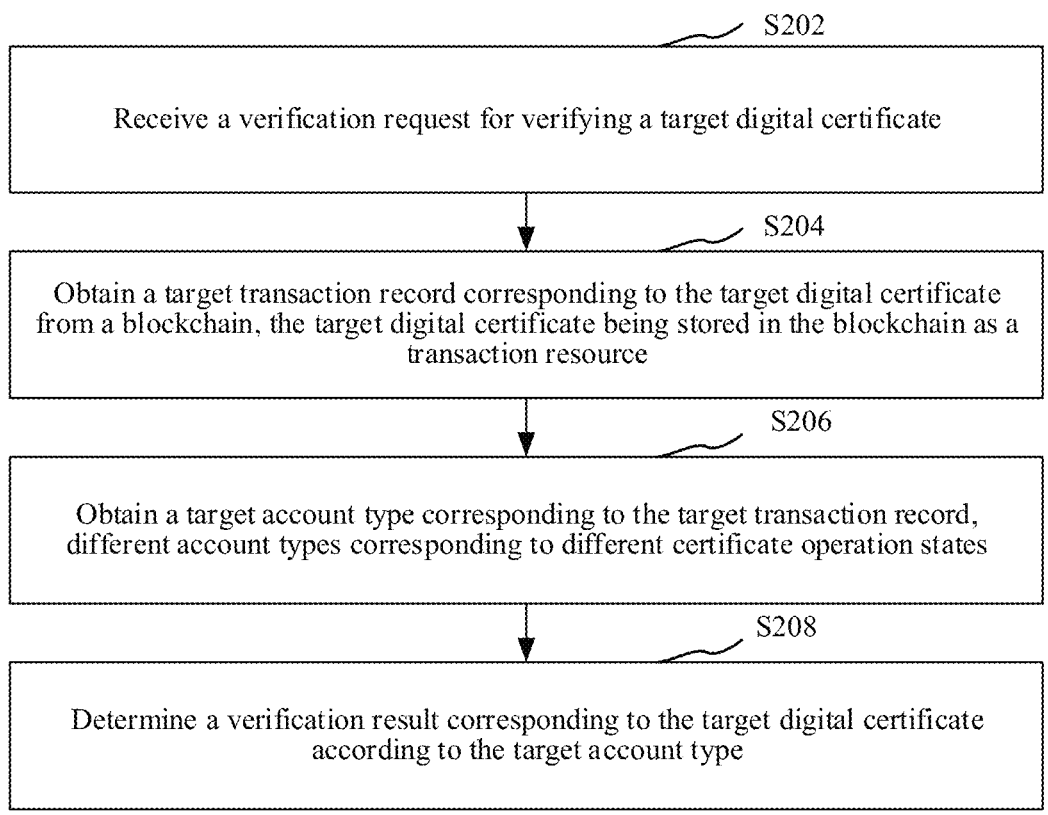
FIG. 2 is a flowchart of a digital certificate verification method according to an embodiment.

As shown in FIG. 2, In one embodiment, a digital certificate verification method is provided. This embodiment is described mainly by using an example in which the method is applied to the authentication center in FIG. 1. The method may specifically include the following steps:

Step S202: Receive a verification request for verifying a target digital certificate.

Specifically, a digital certificate is a string of digits identifying identity information of a communication party in network communication and is used for recognizing the identity of the communication party. The digital certificate provides a manner of authenticating the identity of a communication entity on the Internet, so that the digital certificate is usually issued by a CA. The CA may be, for example, the China Financial Certification Authority (CFCA). The verification request is used for requesting to verify the target digital certificate, to confirm the validity and authenticity of the digital certificate. The target digital certificate is a digital certificate of a node whose identity needs to be authenticated, for example, a digital certificate corresponding to the certificate application node in FIG. 1. The verification request may be transmitted by an interaction node interacting with the certificate application node. For example, when needing to log in to a website corresponding to the certificate application node, the interaction node may obtain the target digital certificate from the certificate application node, and transmit the verification request to the authentication center.

Step S204: Obtain a target transaction record corresponding to the target digital certificate from a blockchain, the target digital certificate being stored in the blockchain as a transaction resource.

Specifically, the transaction resource is a resource that may be used for a transaction. The blockchain is a carrier and organization manner of running a blockchain technology (BT). The BT, also referred to as a distributed ledger technology, is an Internet database technology characterized by decentralization, openness, and transparency, so that everyone can participate in database recording. The BT is a distributed-infrastructure and computing-paradigm that uses a block-chain data structure to authenticate and store data, a distributed-node-consensus algorithm to generate and update data, cryptography to safeguard a process of data transmission and data access, and smart contracts formed by automated scripts to write code and process data. A transaction record is a record of a successful transaction corresponding to a transaction resource. The transaction record may include a transfer-from account transferring the transaction resource and a recipient account receiving the transaction resource during the transaction. The transaction record may include a digital certificate or an identifier corresponding to the digital certificate. In a blockchain, a transaction resource is represented in the form of a transaction record. A transaction record of a certificate is equivalent to an unspent transaction output (UTXO) transaction. The UTXO transaction includes a transaction input and a transaction output. Each transaction has a transaction input, that is, the source of a transaction resource, and a transaction output, that is, the destination of the transaction resource. In this embodiment of this application, an account corresponding to a transaction input is referred to as a transfer-from account, and an account corresponding to a transaction output is referred to as a recipient account. The target transaction record may be a latest transaction record corresponding to the target digital certificate.

In one embodiment, the verification request carries a transaction identifier corresponding to the target digital certificate. When generating a certificate transaction, the authentication center generates a transaction identifier corresponding to the transaction record, and transmits the transaction identifier to the certificate application node, to enable the certificate application node to transmit the transaction identifier to a verification request transmission node. The verification request transmission node herein is the interaction node interacting with the certificate application node.

Step S206: Obtain a target account type corresponding to the target transaction record, different account types corresponding to different certificate operation states.

Specifically, the target digital certificate stored in the blockchain presents operation states of the certificate by using different account types. The target account type may be a recipient account type, that is, the type of an account receiving the target digital certificate. An operation state of a digital certificate in the blockchain may be one of an inserted state, an updated state, and a revoked state. A digital certificate corresponding to the inserted state is inserted into the blockchain as a newly generated initial digital certificate. A digital certificate corresponding to the updated state is a digital certificate obtained after updating the initial digital certificate, that is, the certificate has been updated. A digital certificate corresponding to the revoked state is a digital certificate that has been revoked. The types of accounts of the authentication centers may include a certificate recovery account type and a certificate issuance state type. For a digital certificate in a revoked state, a corresponding recipient account type in the latest transaction record is the certificate recovery account type. When a recipient account type in a transaction record is the certificate recovery account type, it indicates that a digital certificate is in a revoked state, that is, the digital certificate has been revoked. For a digital certificate in an inserted state or an updated state, a corresponding recipient account type in the latest transaction record is the certificate issuing account type. When a recipient account type in a transaction record is the certificate issuing account type, it indicates that a digital certificate has been issued, that is, the digital certificate is in an issued state and is a valid digital certificate.

Step S208: Determine a verification result corresponding to the target digital certificate according to the target account type.

Specifically, the verification result may be that the verification succeeds or the verification fails. After the target transaction record is obtained, it is determined, according to the target account type in the target transaction record, that the verification result corresponding to the target digital certificate is that the verification succeeds or the verification fails, and an operation state of the target digital certificate may be determined based on the target account type corresponding to the latest transaction record. If the recipient account type corresponding to the latest transaction record is a certificate recovery account type, the target digital certificate has been revoked, and the verification result corresponding to the target digital certificate is that the verification fails. If the recipient account type corresponding to the latest transaction record is a certificate issuing account type, the digital certificate may be an inserted digital certificate or an updated digital certificate. Therefore, the digital certificate is valid, and the verification result corresponding to the target digital certificate is that the verification succeeds. Alternatively, a transfer-from account type corresponding to the latest transaction record may be obtained. If the transfer-from account is a preset initial account, the digital certificate is a newly inserted digital certificate, and the verification succeeds.

In one embodiment, the target transaction record is the latest transaction record, and the obtaining a target account type corresponding to the target transaction record includes: obtaining a current recipient account type as the target account type, the current recipient account type corresponding to the latest transaction record and belonging to an account receiving the target digital certificate. The determining a verification result corresponding to the target digital certificate according to the target account type includes: determining, if the current recipient account type is a certificate issuing account type, that the verification result corresponding to the target digital certificate is that the verification succeeds; and determining, if the current recipient account type is a certificate recovery account type, that the verification result corresponding to the target digital certificate is that the verification fails. The current account type is the type of a recipient account in the latest transaction record.

In the digital certificate verification method, a verification request for verifying a target digital certificate is received; a target transaction record corresponding to the target digital certificate is obtained from a blockchain, the target digital certificate being stored in the blockchain as a transaction resource; a target account type corresponding to the target transaction record is obtained, different account types corresponding to different certificate operation states; and a verification result corresponding to the target digital certificate is determined according to the target account type. Because a digital certificate is stored in a blockchain as a transaction resource, a transaction record is not prone to tampering, and different account types correspond to different certificate operation states, a verification result obtained according to an account type in the transaction record in the blockchain has high reliability and high network security.

Figure 3:
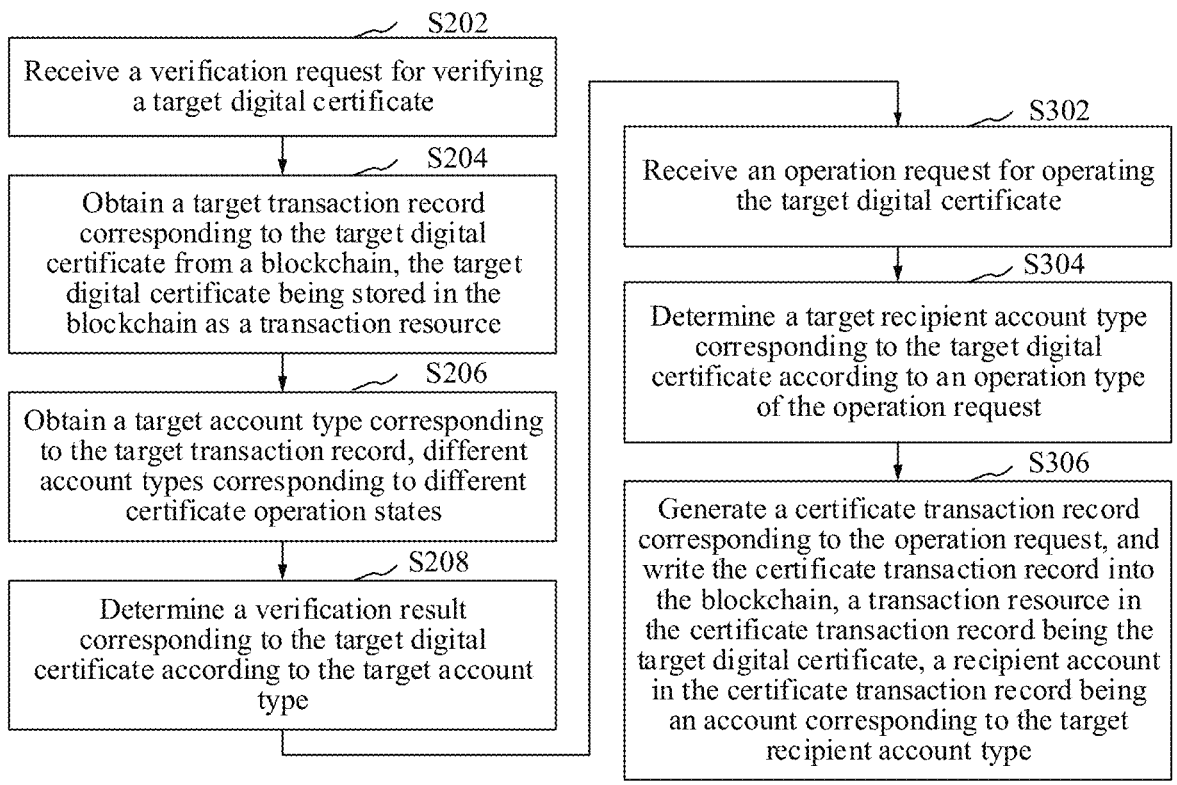
FIG. 3 is a flowchart of a digital certificate verification method according to an embodiment.

In one embodiment, as shown in FIG. 3, the digital certificate verification method may include the following steps:

Step S302: Receive an operation request for operating the target digital certificate.

Specifically, the operation may be one of an insertion operation, a revocation operation, and an update operation. The insertion operation is an operation corresponding to the storage of a digital certificate into a blockchain for the first time. The update operation is an operation corresponding to the update of the stored target digital certificate. The revocation operation is an operation corresponding to the revocation of the target digital certificate. The operation request for operating the target digital certificate may be triggered by a certificate application node, a authentication center or another node. For example, if the target digital certificate needs to be updated, the certificate application node may transmit a digital certificate update request. If the target digital certificate needs to be revoked, the certificate application node may transmit a digital certificate revocation request. Alternatively, if the authentication center finds that a deception action exists when the certificate application node obtains the target digital certificate, a worker at the authentication center may initiate a revocation operation in the authentication center, and the authentication center triggers a digital certificate revocation request according to the revocation operation, to request to revoke the digital certificate. Alternatively, when generating the target digital certificate and needing to store the target digital certificate into the blockchain, the authentication center may also trigger the operation request for operating the target digital certificate.

Step S304: Determine a target recipient account type corresponding to the target digital certificate according to an operation type of the operation request.

The target recipient account type corresponding to the target digital certificate may be a target recipient account type corresponding to an account receiving the target digital certificate.

Specifically, different operation types correspond to different recipient account types. The types of accounts of the authentication centers may include a certificate recovery account type and a certificate issuance state type. For a revocation operation type, a corresponding recipient account type is the certificate recovery account type. When a recipient account type in a transaction record is the certificate recovery account type, it indicates that a digital certificate is in a revoked state, that is, has been revoked. For an update operation type and an insertion operation type, a corresponding account type is the certificate issuing account type. When a recipient account type in a transaction record is the certificate issuing account type, it indicates that a digital certificate has been issued, that is, the digital certificate is in an issued state and is a valid digital certificate.

In one embodiment, the target recipient account type may be a certificate issuing account type if the operation type corresponding to the operation request is an update operation type or an insertion operation type.

In one embodiment, the target recipient account type is a certificate recovery account type if the operation type corresponding to the operation request is a revocation operation type. A certificate recovery account and a certificate issuing account may be accounts corresponding to a certification node generating a digital certificate.

Step S306: Generate a certificate transaction record corresponding to the operation request, and write the certificate transaction record into the blockchain, a transaction resource in the certificate transaction record being the target digital certificate, a recipient account in the certificate transaction record being an account corresponding to the target recipient account type.

Specifically, in a transaction, a recipient account is an account having a transaction resource. A transfer-from account is an account transferring the transaction resource to the recipient account. The target digital certificate is used as a resource that may be transacted, and the blockchain stores the transaction record of the digital certificate. A correspondence between an account type and an account is preset. For example, an account corresponding to the certificate issuing account type is 00001, and an account corresponding to the certificate recovery account type is 00002. After the target recipient account type is obtained, the account corresponding to the target recipient account type is obtained as the recipient account corresponding to the certificate transaction record. After the certificate transaction record is obtained, the certificate transaction record is written into a block of the blockchain, so that the block stores the certificate transaction record. It may be understood that when the certificate transaction record is written into the block, the certificate transaction record is broadcast, so that a node in the blockchain also stores the certificate transaction record in a block. Before the certificate transaction record is broadcast, the certificate transaction record may be signed by using a private key, and the signed certificate transaction record is broadcast. When the certificate transaction record is generated, a corresponding transaction identifier may be generated for identifying a certificate transaction.

In one embodiment, after the transaction identifier corresponding to the certificate transaction record is generated, the transaction identifier is transmitted to the certificate application node. Accordingly, an interaction node communicating with the certificate application node may obtain the transaction identifier corresponding to the certificate application node and the target digital certificate, and obtain, from the blockchain according to the transaction identifier, the transaction record, stored in the blockchain, of the target digital certificate, to perform certificate verification.

It may be understood that steps S302 to S306 may be performed before steps S202 to S208 or may be performed after steps S202 to S208.

Figure 4:
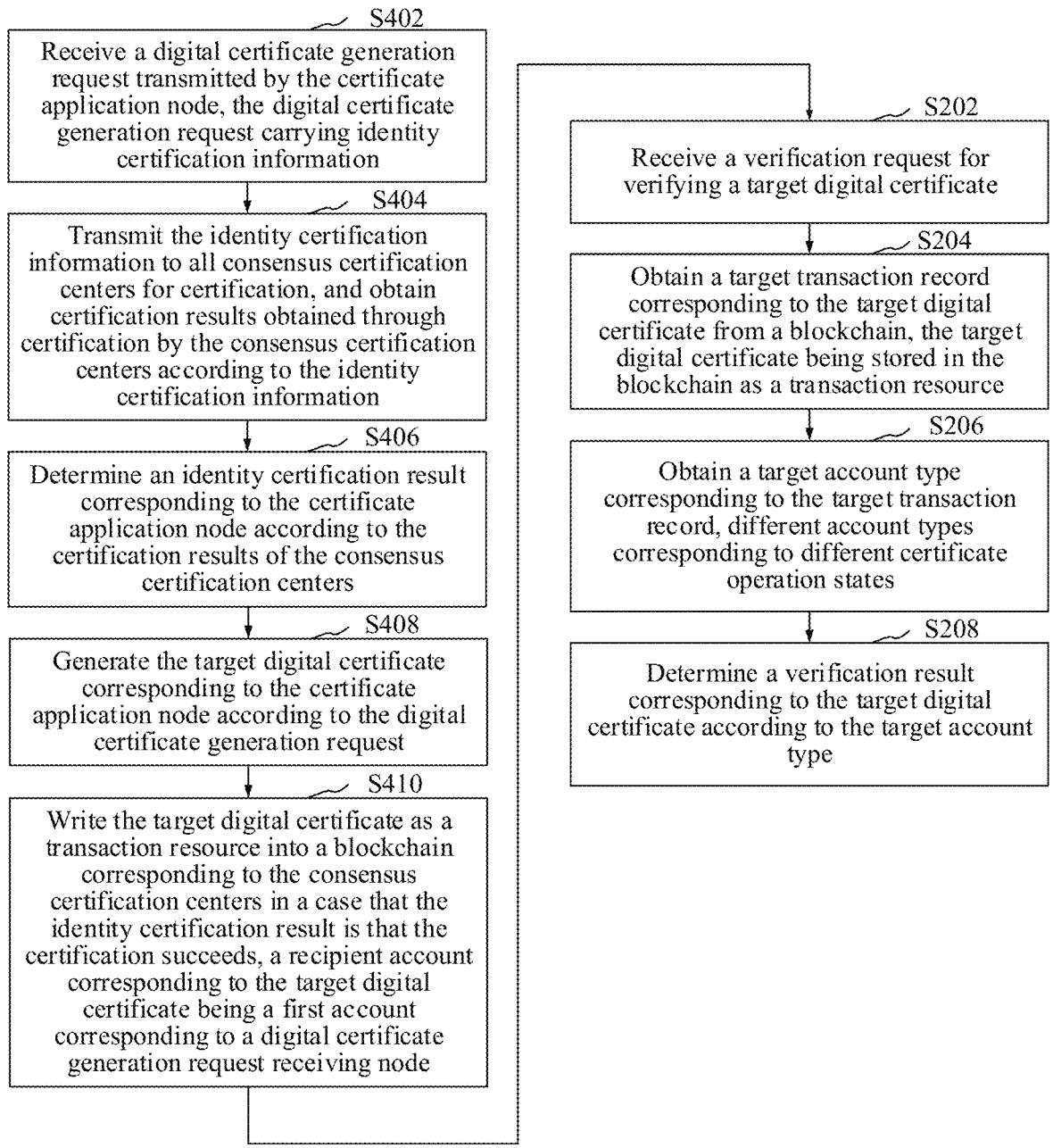
FIG. 4 is a flowchart of a digital certificate verification method according to an embodiment.

In one embodiment, the operation performed on the target digital certificate is the insertion operation. As shown in FIG. 4, the digital certificate verification method may further include the following steps:

Step S402: Receive a digital certificate generation request transmitted by the certificate application node, the digital certificate generation request carrying identity certification information.

Specifically, the identity certification information is used for certifying the identity of the certificate application node. The identity certification information may be, for example, business license information corresponding to an enterprise of the certificate application node or identity card information corresponding to an individual user of the certificate application node. The certificate application node is a node needing to apply for a digital certificate. For example, when needing to create a website, an enterprise needs to apply for a digital certificate corresponding to the website. In this case, an enterprise server needing to apply for the digital certificate may transmit a digital certificate generation request to a authentication center.

In one embodiment, the digital certificate generation request may further carry a public key. The public key and the private key are a secret key pair obtained by using an algorithm. The public key is a public secret key in the secret key pair, and the private key is a non-public secret key. The public key is usually used for encrypting a session key or authenticating a digital signature. When needing to apply for a digital certificate, the certificate application node generates a secret key pair, stores the secret key pair of the private key, and transmits the public key to the authentication center, so that the authentication center writes the public key into the digital certificate. Accordingly, the certificate application node may sign transmitted information by using the private key, and a node receiving the signed information may perform, by using the public key of the digital certificate, signature certification on the information transmitted by the certificate application node, to determine that the received information is the information transmitted by the certificate application node.

Step S404: Transmit the identity certification information to all consensus authentication centers for certification, and obtain certification results obtained through authentication by the consensus authentication centers according to the identity certification information.

Specifically, a quantity of the consensus authentication centers may be set as required. The transmission of the identity certification information may be implemented by using a peer-to-peer (P2P) technology. A authentication center 1 may broadcast the identity certification information in the blockchain, and a consensus authentication center receiving the identity certification information may continue to broadcast the identity certification information, so that all the consensus authentication centers can receive the identity certification information. The consensus authentication center is a authentication center for performing consensus authentication, and consensus is a process in which a plurality of participating nodes reach the consistency of some data, actions or procedures through interaction between the plurality of nodes according to a preset rule. A consensus algorithm used for consensus may be the practical Byzantine fault tolerance (PBFT). The authentication center may be an authoritative and impartial computer node that undertakes work such as a certification service and issuance of a digital certificate to confirm a node identity in a network. After each of the consensus authentication centers receives the identity certification information, the received identity certification information may be compared with prestored identity certification information of the certificate application node or the received identity certification information may be transmitted to a trusted source storing identity certification information for comparison, to determine whether received identity certification information is consistent with the stored identity certification information. When they are consistent, the received identity certification information is authentic, and a certification result corresponding to the consensus authentication center is that the certification succeeds. When they are inconsistent, the certification fails. The trusted source may be a node issuing identity certification information, for example, a node corresponding to a public security organ that issues a personal identity card.

Step S406: Determine an identity certification result corresponding to the certificate application node according to the certification results of the consensus authentication centers.

Specifically, the identity certification result may be that the identity certification succeeds or the identity certification fails. The identity certification result is obtained through calculation in combination with the certification results of the consensus authentication centers. When the identity certification result is determined, at least one of a first quantity corresponding to consensus authentication centers whose certification results are that the certification succeeds and a second quantity corresponding to consensus authentication centers whose certification results are that the authentication fails may be obtained, and the identity certification result is determined according to at least one of the first quantity and the second quantity. For example, the identity certification result may be that the identity certification succeeds when at least one of the following conditions is met: the first quantity is greater than the second quantity, the first quantity reaches a first preset threshold, a ratio of the first quantity to a quantity of the authentication centers participating in the consensus verification reaches a second preset threshold, and a ratio of the first quantity to a quantity of nodes of the blockchain reaches a third preset threshold. It may be understood that the authentication center 1 is also a consensus authentication center. Specific values corresponding to the first preset threshold, the second preset threshold, and the third preset threshold may be set as required. For example, assuming that certification results corresponding to authentication centers 1 to 4 are respectively that the certification succeeds, the certification succeeds, the certification succeeds, and the certification fails, the first quantity is 3, and the second quantity is 1. Assuming that a condition of the identity certification result being that the certification succeeds is that a proportion of the first quantity in the total quantity of the consensus authentication centers is greater than or equal to ¾, the identity certification succeeds.

Step S408: Generate the target digital certificate corresponding to the certificate application node according to the digital certificate generation request.

Specifically, a digital certificate is a file with a digital signature from a authentication center and is used for verifying the identity of a network node. The digital certificate may include identity information of the certificate application node and public key information and is further attached with signature information of the authentication center. Certainly, the digital certificate may further include information such as a validity period of the digital certificate. The target digital certificate may be generated after it is determined that the identity certification succeeds. The target digital certificate may be generated before it is determined that the identity certification succeeds. When the target digital certificate is generated before it is determined that that the certification succeeds, when the identity certification succeeds, the target digital certificate may be quickly written into the blockchain. If the target digital certificate is generated after it is determined that the certification succeeds, they method can avoid the situation in which the target digital certificate also needs to be generated when the identity certification fails.

Figure 5:
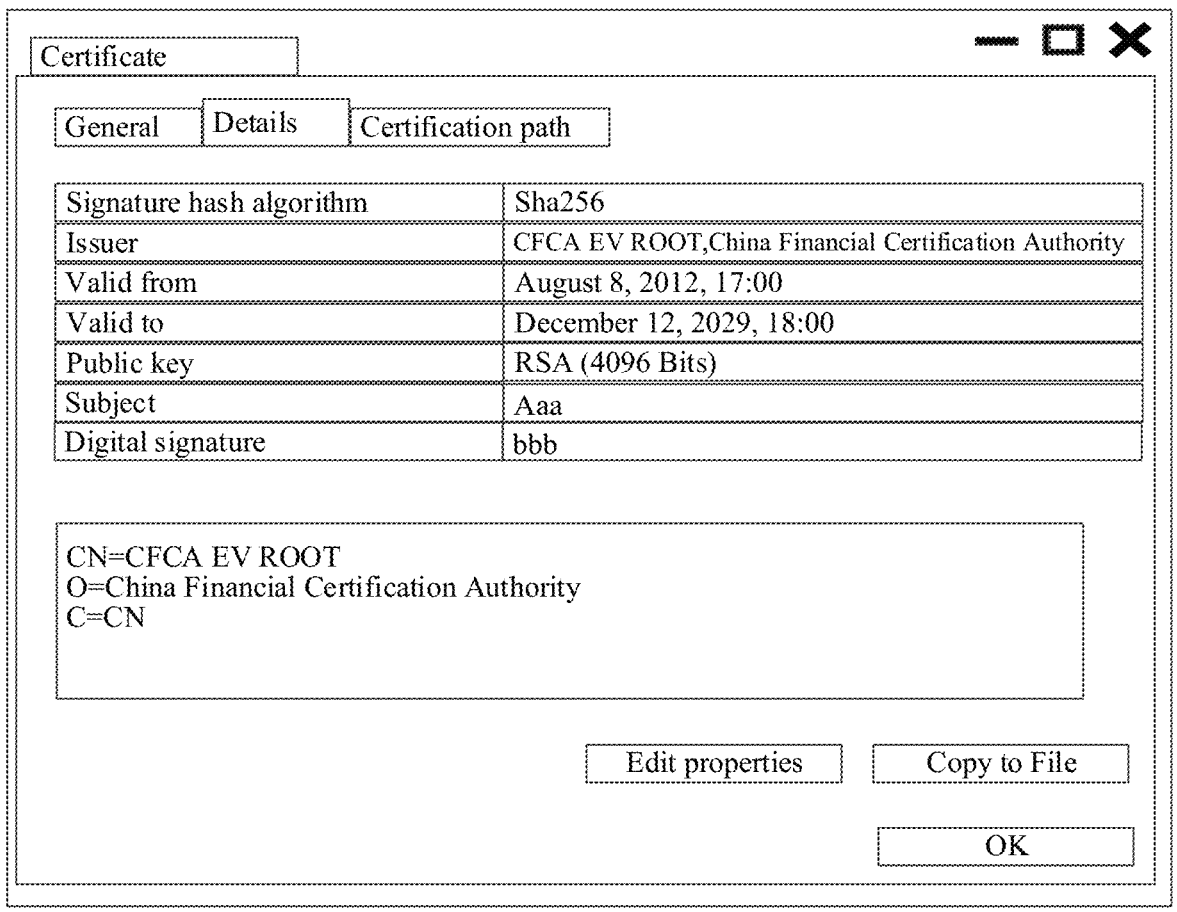
FIG. 5 is a schematic diagram of a digital certificate according to an embodiment.

FIG. 5 is a schematic diagram of a digital certificate. The digital certificate includes information about a certificate issuer, a public key of a certificate application node, information about the certificate application node, that is, a certificate owner, validity period information, a signature hash algorithm for a digital signature, and a digital signature. The digital signature is a message digest obtained by calculating the digital certificate according to the signature hash algorithm agreed by both parties. It can be mathematically ensured that provided that any digit in the digital certificate is changed, a recalculated value of the message digest becomes inconsistent with an original value. Accordingly, it is ensured that it may be recognized whether the digital certificate is changed.

Step S410: Write the target digital certificate as a transaction resource into a blockchain corresponding to the consensus authentication centers if the identity certification succeeds, a recipient account corresponding to the target digital certificate being a first account corresponding to a digital certificate generation request receiving node.

Specifically, the blockchain into which the target digital certificate is written is the blockchain corresponding to the consensus authentication centers. The digital certificate generation request receiving node is a node receiving the digital certificate generation request. In a transaction, a recipient account is an account having a transaction resource. A transfer-from account is an account transferring the transaction resource to the recipient account. When the target digital certificate is written into the blockchain, the target digital certificate is used as a resource that may be transacted, and the blockchain stores the transaction record of the digital certificate. When the target digital certificate is stored into the blockchain, the recipient account in the transaction record of the target digital certificate is an account corresponding to the node receiving the digital certificate generation request. The target digital certificate is a target digital certificate that is stored for the first time, so that the transfer-from account may be a preset account. For example, the transfer-from account may be a character string with all Os, representing that the transaction resource is an initial transaction resource. When the target digital certificate is written as a transaction resource into the blockchain corresponding to the consensus authentication centers, a new block may be created, and the target digital certificate is written into the created new block.

An account in the blockchain may also be referred to as an address. The address may be obtained by performing a one-way encryption hash algorithm on a public key. The hash algorithm is a one-way function that receives an input having an arbitrary length to generate a fingerprint digest. An algorithm used to generate the address from the public key is a secure hash algorithm (SHA) or the RACE integrity primitives evaluation message digest (RIPEMD) algorithm, for example, the SHA256 algorithm or the RIPEMD160 algorithm.

In this embodiment of this application, consensus authentication may be performed by using the identity certification information, and the target digital certificate is written into the blockchain when the obtained identity certification succeeds. If the authentication center is hijacked, it is difficult to write the digital certificate into the blockchain. In addition, the digital certificate is written as a transaction resource into a block, the recipient account is the account corresponding to the digital certificate generation request receiving node, and other nodes cannot randomly change or revoke the digital certificate, thereby ensuring the security of the digital certificate, improving the reliability of the digital certificate, and also improving network security.

Figure 6:
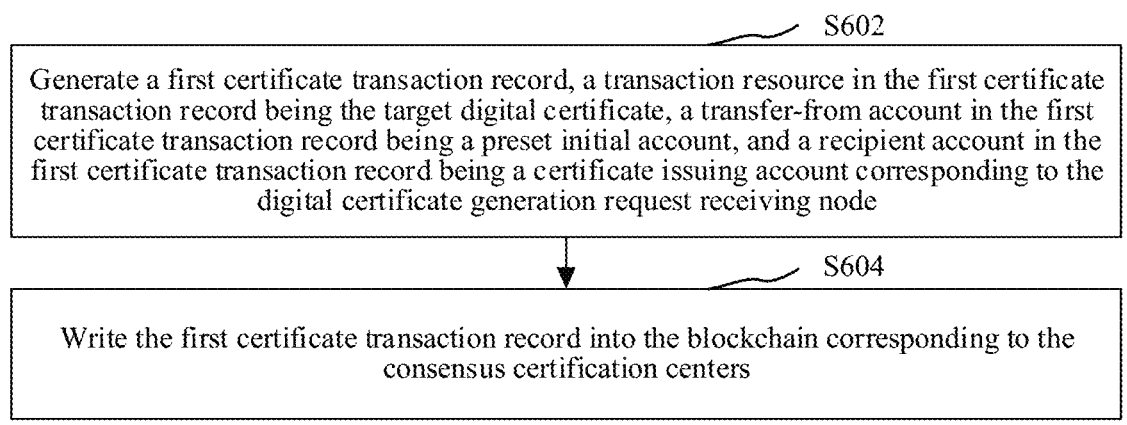
FIG. 6 is a flowchart of writing a target digital certificate as a transaction resource into a blockchain corresponding to a consensus authentication center according to an embodiment.

In one embodiment, as shown in FIG. 6, step S410, that is, the step of writing the target digital certificate as a transaction resource into a blockchain corresponding to the consensus authentication centers may specifically include the following steps:

Step S602: Generate a first certificate transaction record, a transaction resource in the first certificate transaction record being the target digital certificate, a transfer-from account in the first certificate transaction record being a preset initial account, and a recipient account in the first certificate transaction record being a certificate issuing account corresponding to the digital certificate generation request receiving node.

Specifically, the certificate transaction record may include a transfer-from account transferring the transaction resource and a recipient account receiving the transaction resource during the transaction. The transaction record includes a digital certificate or an identifier corresponding to the digital certificate. The preset initial account is preset and is used for indicating that before the current transaction is performed, the transaction resource is an initial resource that has not been transacted. Equivalent to the Coinbase transaction corresponding to mining income of a Bitcoin transaction, a specific value of the preset initial account may be set as required. For example, the value may be a character string with all 0s. A quantity of the characters in the character string may be set as required. The certificate issuing account is an account for issuing a certificate. When the recipient account type is the certificate issuing account type, it indicates that the digital certificate is in an issued state and is a valid digital certificate. The certificate transaction record may also include information such as a certificate transaction time.

In one embodiment, the transfer-from account in the certificate transaction record may be a recipient account in a previous transaction record of the certificate transaction record. Alternatively, a transaction identifier corresponding to the previous certificate transaction record of the certificate transaction record may be used to identify a transaction input. That is, the transfer-from account may be represented by the transaction identifier corresponding to the previous transaction record.

Step S604: Write the first certificate transaction record into the blockchain corresponding to the consensus authentication centers.

Specifically, after the first certificate transaction record is obtained, the first certificate transaction record is written into a block of the blockchain corresponding to the consensus authentication centers, so that the block stores the first certificate transaction record. It may be understood that when the first certificate transaction record is written into the block, the first certificate transaction record is broadcast, so that a node in the blockchain also stores the first certificate transaction record in a block. Before the first certificate transaction record is broadcast, the first certificate transaction record may be signed by using a private key, and the signed first certificate transaction record is broadcast.

In one embodiment, after a first transaction identifier corresponding to the first certificate transaction record is generated, the first transaction identifier is transmitted to the certificate application node. Accordingly, a node communicating with the certificate application node may obtain the first transaction identifier corresponding to the certificate application node and the target digital certificate, and obtain, from the blockchain according to the first transaction identifier, the transaction record, stored in the blockchain, of the target digital certificate, to perform certificate verification.

In one embodiment, after the target digital certificate is inserted into the blockchain, the target digital certificate may be revoked or updated. When the operation performed on the target digital certificate by the authentication center is an update operation or a revocation operation, a second certificate transaction record is generated, and the second certificate transaction record is written into the blockchain, a transaction resource in the second certificate transaction record being the target digital certificate. When the operation performed on the target digital certificate is an update operation, a recipient account in the second certificate transaction record is a second account corresponding to a target recipient account type corresponding to the update operation. When the operation performed on the target digital certificate is a revocation operation, a recipient account in the second certificate transaction record is a second account corresponding to a target recipient account type corresponding to the revocation operation.

It may be understood that a transfer-from account in the second certificate transaction record may be a recipient account in a previous transaction record of the second certificate transaction record. For example, when the previous transaction record of the second certificate transaction record is the first certificate transaction record, the transfer-from account in the second certificate transaction record is the first account, the first account being the recipient account in the first certificate transaction record. Alternatively, a transaction identifier corresponding to the previous transaction record of the second certificate transaction record may be used to identify a transaction input. That is, the transfer-from account may be represented by the transaction identifier corresponding to the previous transaction record.

In the blockchain, the operation of writing the digital certificate into the blockchain for the first time is referred to as an insertion operation. The insertion operation is used as a transaction. A transaction record is formed and written into the blockchain. The target recipient account type of the account receiving the target digital certificate is determined according to the operation type of the operation request, and the second transaction record is generated. The recipient account in the second certificate transaction record is the second account corresponding to the target recipient account type. Therefore, different account types may be used to represent whether the digital certificate has been revoked or updated. Generally, because a stored transaction record is tamperproof, when the digital certificate needs to be updated or revoked subsequently, an operation performed on the digital certificate may also be used as a transaction, and a corresponding transaction record is formed according to the type of the operation and stored in the blockchain. Accordingly, if the state of the digital certificate needs to be queried, it may be determined, according to the account type corresponding to the latest transaction record, whether the digital certificate has been updated or revoked.

In one embodiment, the authentication center may return a second transaction identifier corresponding to the second certificate transaction record to the certificate application node, to enable the certificate application node to transmit the second transaction identifier to the interaction node. The transaction identifier carried in the verification request may be the second transaction identifier.

In one embodiment, the target transaction record is the latest transaction record, the verification request carries a transaction identifier corresponding to the target digital certificate, and the obtaining a target transaction record corresponding to the target digital certificate from a blockchain includes: obtaining a transaction chain corresponding to the target digital certificate according to the transaction identifier, and using a transaction record at the end of the transaction chain as the latest transaction record, transaction records in the transaction chain being sequentially arranged in transaction order. The transaction chain may be the blockchain storing the transaction record corresponding to the digital certificate.

Specifically, the latest transaction record is a transaction record having the latest transaction time in transaction records corresponding to the target digital certificate. In the blockchain, the operations performed on the target digital certificate are considered as transactions performed on the target digital certificate. Therefore, the blockchain stores the transaction records of the target digital certificate, and the transaction record having the latest transaction time may be obtained from the transaction records of the target digital certificate as the latest transaction record.

Transaction records of transaction resources in the blockchain are sequentially connected. The form of the transaction chain is that a transaction consumes an output of a parent transaction and creates an input for a subsequent transaction (child transaction). The transaction records in the transaction chain are sequentially arranged in transaction order. Therefore, the transaction chain corresponding to the target digital certificate may be obtained according to the transaction identifier, and a transaction record at the end of the transaction chain is used as the latest transaction record. The end of the transaction chain is an end point at which the transaction record having the latest transaction time is located. Each transaction record records a transaction identifier corresponding to a parent transaction.

Figure 7:
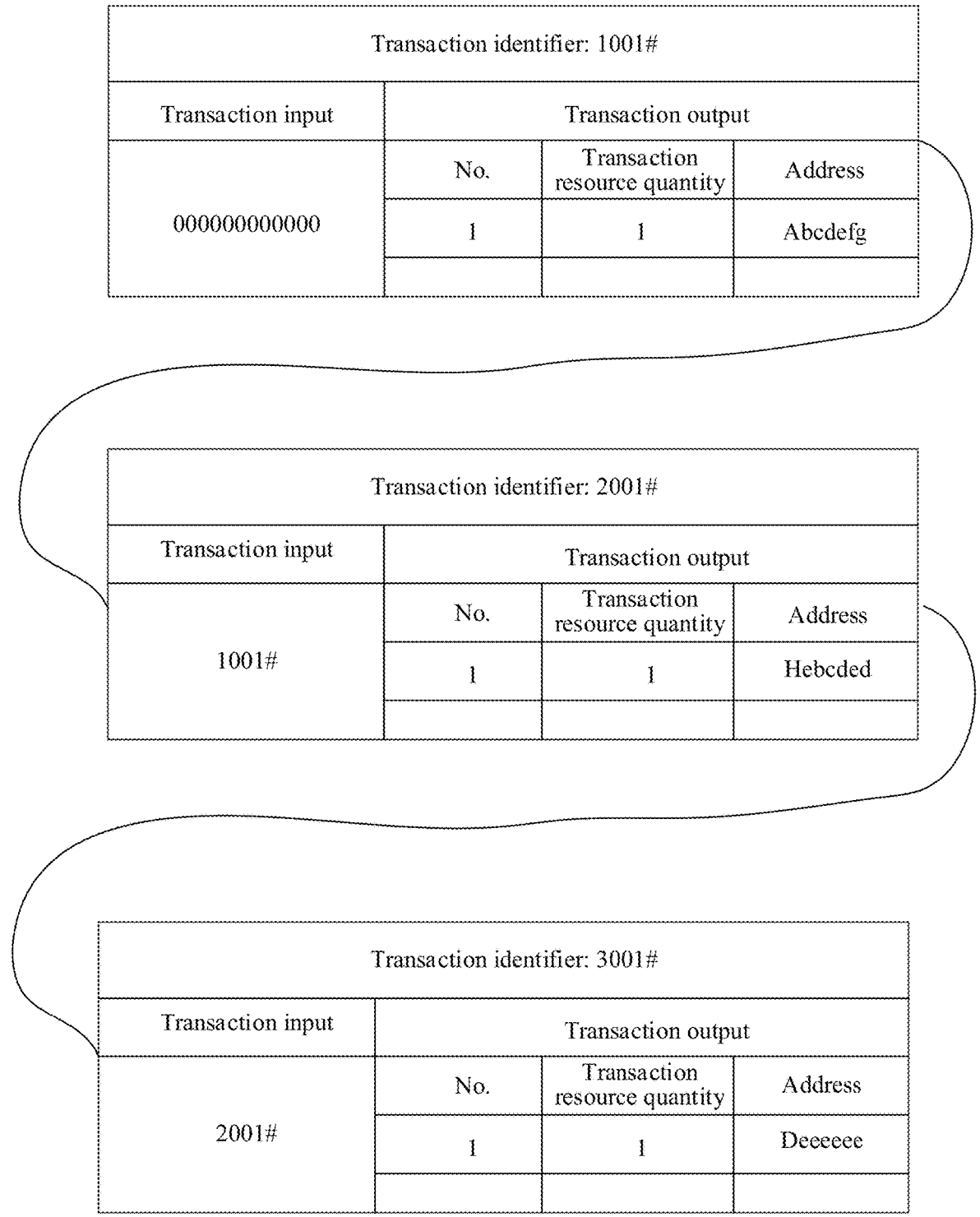
FIG. 7 is a schematic diagram of a transaction chain according to an embodiment.

FIG. 7 is a diagram of a transaction chain. In FIG. 7, a transaction record having a transaction identifier 1001 # is a record corresponding to an operation of writing a digital certificate into a blockchain, 1001 # is the parent transaction of 2001 #, and 2001 # is the parent transaction of 3001 #. The transaction record may include a digital certificate or an identifier corresponding to the digital certificate. It may be obtained from FIG. 7 that a transaction input is a transaction identifier corresponding to a last transaction. A transaction output is an account corresponding to a user, and may also be referred to as an address. A plurality of transaction outputs may exist in one transaction record, and one transaction record may include a plurality of transaction resources.

In one embodiment, a verification request carries a second transaction identifier, and a transaction chain corresponding to a target digital certificate may be obtained according to the second transaction identifier. The second transaction identifier is an identifier corresponding to a second certificate transaction record. When generating the second certificate transaction record, a authentication center may transmit the second transaction identifier to a certificate application node, to enable the certificate application node to transmit the second transaction identifier to a corresponding interaction node.

In one embodiment, the verification request carries a first transaction identifier, and a latest transaction record may be obtained according to the first transaction identifier of the target digital certificate by using the transaction chain. In this case, even though the second transaction identifier corresponding to the second transaction record is not transmitted to the certificate application node in time, the latest transaction record may be alternatively obtained by using the first transaction identifier because the transaction identifier transmitted to the interaction node by the certificate application node is the first transaction identifier.

Figure 8:
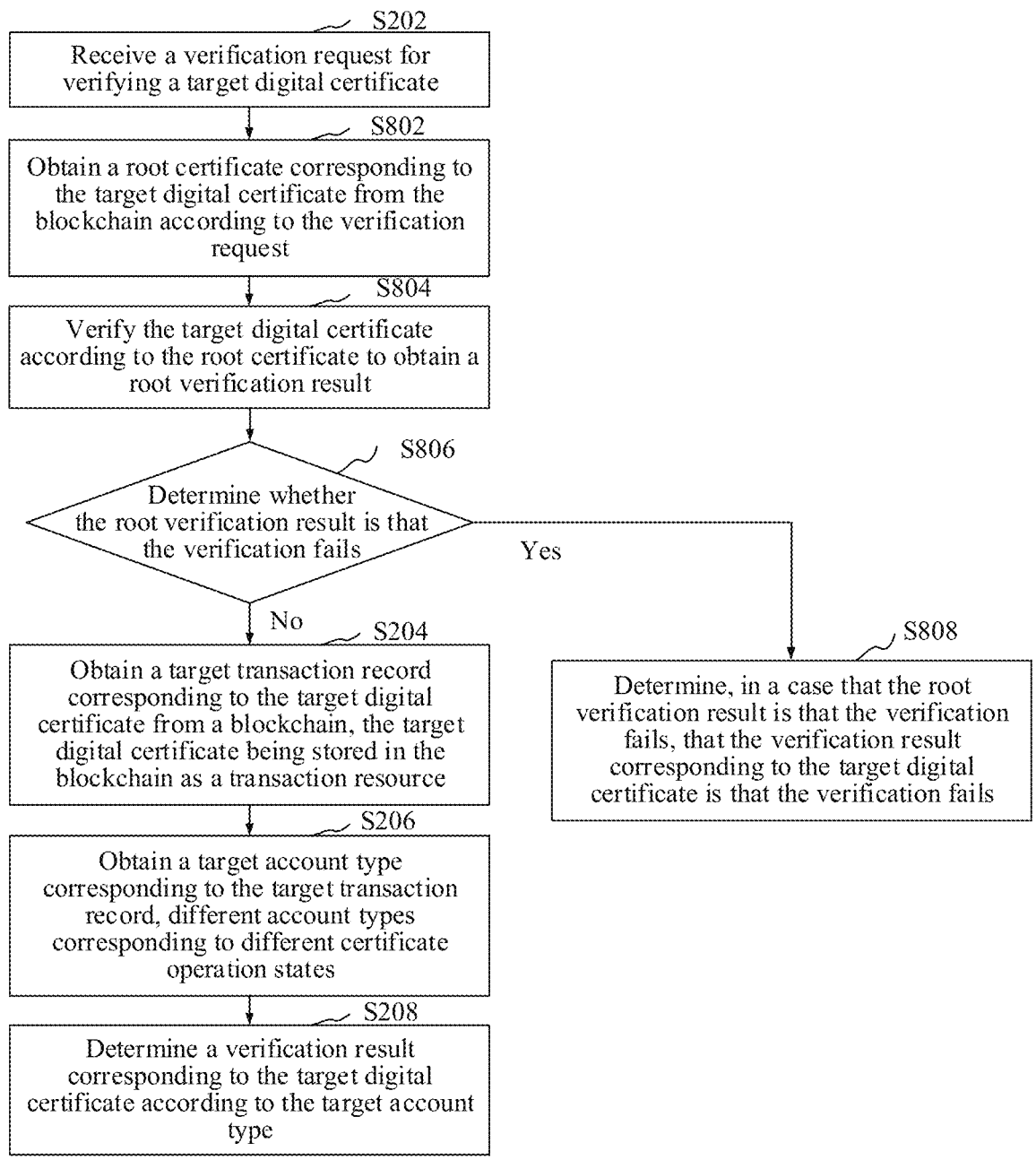
FIG. 8 is a flowchart of a digital certificate verification method according to an embodiment.

As shown in FIG. 8, In one embodiment, the digital certificate verification method may further include the following steps:

Step S802: Obtain a root certificate corresponding to the target digital certificate from the blockchain according to the verification request.

Specifically, the root certificate is a certificate issued by the authentication center to itself, and is a start point of a chain of trust. The root certificate is used for verifying a digital certificate issued by the authentication center, and may use a public key in the root certificate to authenticate a digital signature in the digital certificate, to confirm legality and validity of the digital certificate, that is, authenticate whether the target digital certificate is signed and issued by a CA. The root certificate may be alternatively stored in the blockchain. The root certificate may be stored in a genesis block of the blockchain. The genesis block is the first block of the blockchain, making the root certificate less prone to tampering.

Step S804: Verify the target digital certificate according to the root certificate to obtain a root verification result.

Specifically, the root verification result may be that the verification succeeds or the verification fails. After the root certificate is obtained, the public key in the root certificate may be obtained, to authenticate the digital signature of the target digital certificate. If the authentication of the digital signature succeeds, the verification succeeds. If is determined that the authentication of the digital signature fails, the verification fails.

Step S806: Determine whether the root verification fails.

Specifically, if the root verification fails, perform step S808. If the root verification succeeds, perform step S204.

Step S808: Confirm, if the root verification fails, that the verification result corresponding to the target digital certificate is that the verification fails.

Specifically, if the root verification fails, the verification result corresponding to the target digital certificate is that the verification fails, and it is unnecessary to continue to verify the target digital certificate. If the root verification succeeds, an operation of obtaining a latest transaction record corresponding to the target digital certificate from a blockchain is performed, and the target digital certificate continues to be verified.

In one embodiment, the root certificate, the certificate issuing account, and the certificate recovery account may be stored in the authentication center or may be stored in the blockchain. For example, the root certificate, the certificate issuing account, and the certificate recovery account may be stored in the genesis block of the blockchain. It may be understood that the authentication center receiving the verification request and the authentication center receiving the digital certificate generation request may be the same or different.

For example, the root certificate, the certificate issuing account, and the certificate recovery account may be stored in the authentication center receiving the digital certificate generation request. In this case, only the authentication center receiving the digital certificate generation request can verify the target digital certificate. Each authentication center may also store the root certificate, the certificate issuing account corresponding to the node receiving the digital certificate generation request, and the certificate recovery account; or the root certificate, the certificate issuing account, and the certificate recovery account on the blockchain are open and traceable to the authentication centers participating in consensus. Accordingly, each authentication center may receive the verification request for verifying the target digital certificate, to verify the target digital certificate. Even if a authentication center issuing the certificate is hijacked or collapses, another authentication center may be used alternatively to perform verification. That is, different authentication centers may trust each other, and one authentication center may verify digital certificates issued by a plurality of authentication centers. It is not limited that only a authentication center issuing the certificate can verify a target digital certificate.

In one embodiment, it may be alternatively determined whether the target digital certificate exists in the blockchain. If the target digital certificate exists in the blockchain, the verification of the target digital certificate succeeds. Because a digit of a blockchain is not prone to tampering, if a consistent digital certificate exists in the blockchain, it indicates that the digital certificate is trustworthy.

Figure 9:
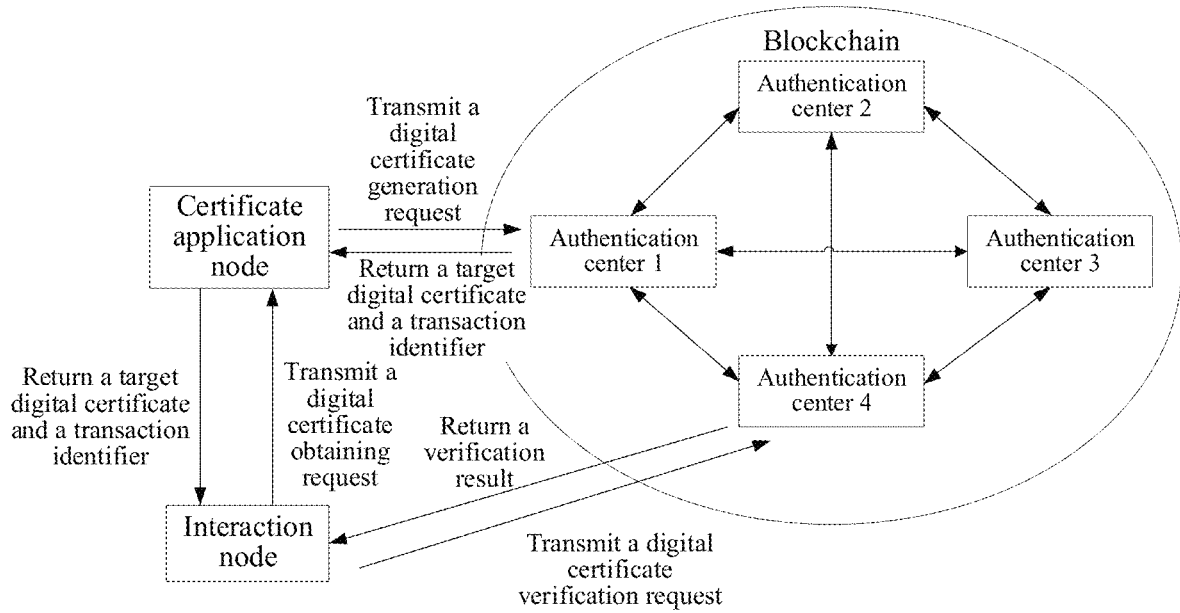
FIG. 9 is a diagram of an application environment of a digital certificate verification method according to an embodiment.

FIG. 9 is a diagram of an application environment of a digital certificate verification method according to an embodiment. The application environment includes a authentication center 1, a authentication center 2, a authentication center 3, and a authentication center 4 that belong to a same blockchain and a certificate application node. The certificate verification method provided in this embodiment of this application is described below with reference to FIG. 9.

1. When it is necessary to apply for a digital certificate, the certificate application node transmits a digital certificate generation request to the authentication center 1, the digital certificate generation request carrying identity certification information.

2. The authentication center 1 receives the digital certificate generation request, and transmits the identity certification information to the authentication center 2, the authentication center 3, and the authentication center 4, to perform consensus authentication.

3. When an identity certification result obtained according to a result of the consensus authentication is that the certification succeeds, the authentication center 1 generates a target digital certificate and a corresponding first transaction record, stores the first transaction record in the latest block in a blockchain, and returns the target digital certificate and a first transaction identifier to the certificate application node.

4. When interacting with the certificate application node, an interaction node transmits a digital certificate obtaining request to the certificate application node.

5. The certificate application node returns the target digital certificate and the first transaction identifier to the interaction node.

6. The interaction node transmits a verification request to the authentication center 4, the verification request carrying the first transaction identifier and the target digital certificate.

7. The authentication center 4 obtains a root certificate from a genesis block, and verifies the target digital certificate according to the root certificate to obtain a root verification result.

8. When the root verification succeeds, the authentication center 4 obtains a recipient account type in a latest transaction record in a transaction chain corresponding to the target digital certificate according to the first transaction identifier, and determines a verification result according to the recipient account type in the latest transaction record. For example, if the recipient account type is a recovery account type, it indicates that the target digital certificate has been revoked, and the verification fails.

It may be understood that another node in the blockchain may receive the verification request and perform verification, provided that the interaction node is considered to be trustworthy. Alternatively, the interaction node may be a node in the blockchain. In this case, the interaction node also obtains the root certificate and a transaction record from blockchain data that is locally stored, to perform verification.

Figure 10:
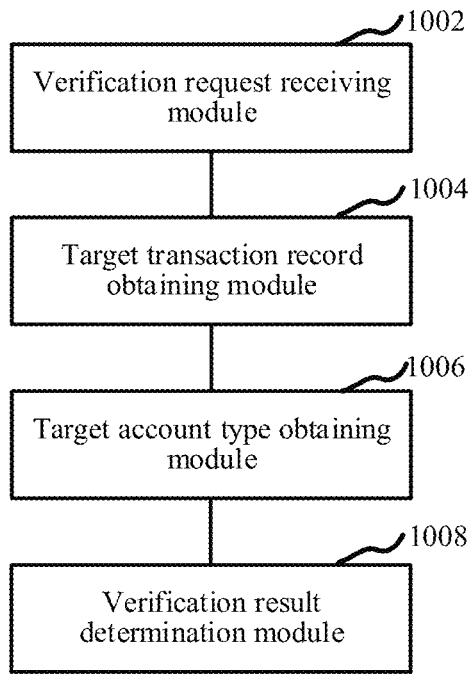
FIG. 10 is a structural block diagram of a digital certificate verification apparatus according to an embodiment.

As shown in FIG. 10, In one embodiment, a digital certificate verification apparatus is provided. The digital certificate verification apparatus may be integrated in the foregoing authentication center 4, and may specifically include: a verification request receiving module 1002, a target transaction record obtaining module 1004, a target account type obtaining module 1006, and a verification result determination module 1008.

The verification request receiving module 1002 is configured to receive a verification request for verifying a target digital certificate.

The target transaction record obtaining module 1004 is configured to obtain a target transaction record corresponding to the target digital certificate from a blockchain, the target digital certificate being stored in the blockchain as a transaction resource.

The target account type obtaining module 1006 is configured to obtain a target account type corresponding to the target transaction record, different account types corresponding to different certificate operation states.

The verification result determination module 1008 is configured to determine a verification result corresponding to the target digital certificate according to the target account type.

Figure 11:
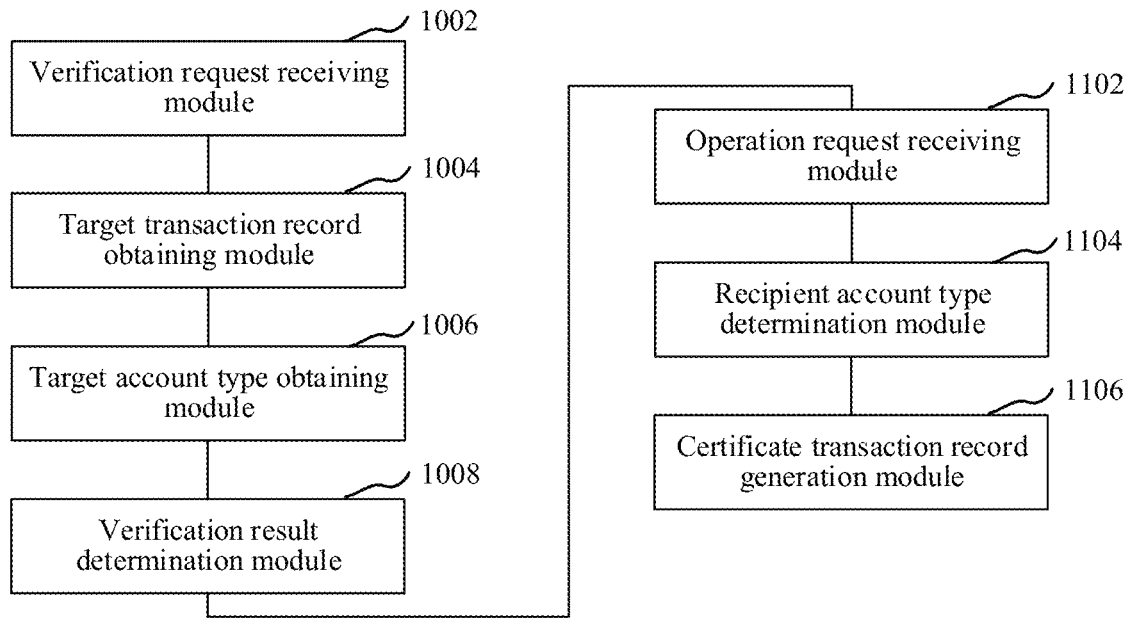
FIG. 11 is a structural block diagram of a digital certificate verification apparatus according to an embodiment.

In one embodiment, as shown in FIG. 11, the digital certificate verification apparatus further includes: an operation request receiving module 1102, configured to receive an operation request for operating the target digital certificate; a recipient account type determination module 1104, configured to determine a target recipient account type corresponding to the target digital certificate according to an operation type of the operation request; and a certificate transaction record generation module 1106, configured to: generate a certificate transaction record corresponding to the operation request, and write the certificate transaction record into the blockchain, a transaction resource in the certificate transaction record being the target digital certificate, a recipient account in the certificate transaction record being an account corresponding to the target recipient account type.

In one embodiment, the recipient account type determination module 1104 is configured to determine that the target recipient account type is a certificate issuing account type if the operation type corresponding to the operation request is an update operation type or an insertion operation type.

In one embodiment, the recipient account type determination module 1104 is configured to determine that the target recipient account type is a certificate recovery account type if the operation type corresponding to the operation request is a revocation operation type.

In one embodiment, the target transaction record is a latest transaction record; the target account type obtaining module 1006 is configured to obtain a current recipient account type as the target account type, the current recipient account type corresponding to the latest transaction record and belonging to an account receiving the target digital certificate; and the verification result determination module 1008 is configured to: determine, if the current recipient account type is a certificate issuing account type, that the verification result corresponding to the target digital certificate is that the verification succeeds.

In one embodiment, the target account type obtaining module 1006 is configured to obtain a current recipient account type as the target account type, the current recipient account type corresponding to the latest transaction record and belonging to an account receiving the target digital certificate; and the verification result determination module 1008 is configured to: determine, if the current recipient account type is a certificate recovery account type, that the verification result corresponding to the target digital certificate is that the verification fails.

In one embodiment, the verification request carries a transaction identifier corresponding to the target digital certificate, and the target transaction record obtaining module 1004 is configured to: obtain a transaction chain corresponding to the target digital certificate according to a first transaction identifier, and use a transaction record at the end of the transaction chain as the latest transaction record, transaction records in the transaction chain being sequentially arranged in transaction order.

Figure 12:
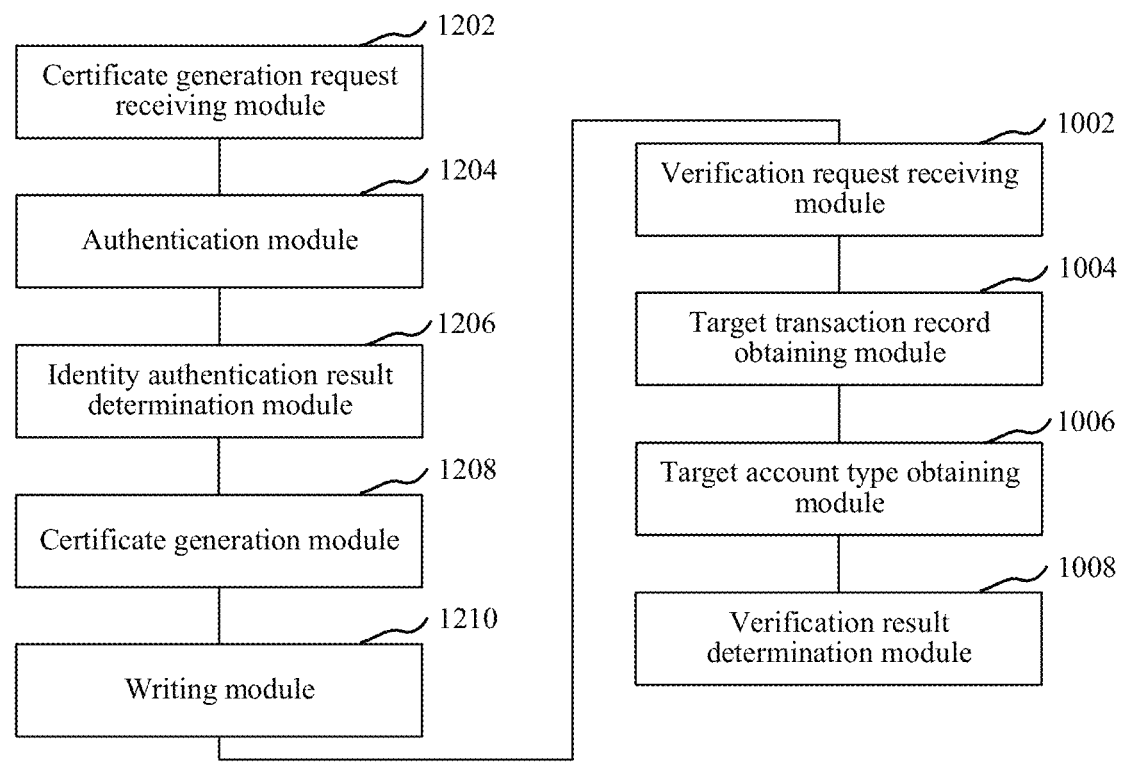
FIG. 12 is a structural block diagram of a digital certificate verification apparatus according to an embodiment.

In one embodiment, as shown in FIG. 12, the digital certificate verification apparatus further includes: a certificate generation request receiving module 1202, configured to receive a digital certificate generation request transmitted by the certificate application node, the digital certificate generation request carrying identity certification information; a certification module 1204, configured to: transmit the identity certification information to all consensus authentication centers for certification, and obtain certification results obtained through authentication by the consensus authentication centers according to the identity certification information; an identity certification result determination module 1206, configured to determine an identity certification result corresponding to the certificate application node according to the certification results of the consensus authentication centers; a certificate generation module 1208, configured to generate the target digital certificate corresponding to the certificate application node according to the digital certificate generation request; and a writing module, configured to write the target digital certificate as a transaction resource into a blockchain corresponding to the consensus authentication centers if the identity succeeds, a recipient account corresponding to the target digital certificate being a first account corresponding to a digital certificate generation request receiving node.

In one embodiment, the digital certificate verification apparatus further includes: a root certificate obtaining module, configured to obtain a root certificate corresponding to the target digital certificate from the blockchain according to the verification request; a root verification result obtaining module, configured to verify the target digital certificate according to the root certificate to obtain a root verification result; and an execution module, configured to: determine, if the root verification fails, that the verification result corresponding to the target digital certificate is that the verification fails, if the root verification succeeds, perform the operation of obtaining a target transaction record corresponding to the target digital certificate from a blockchain.

Figure 13:
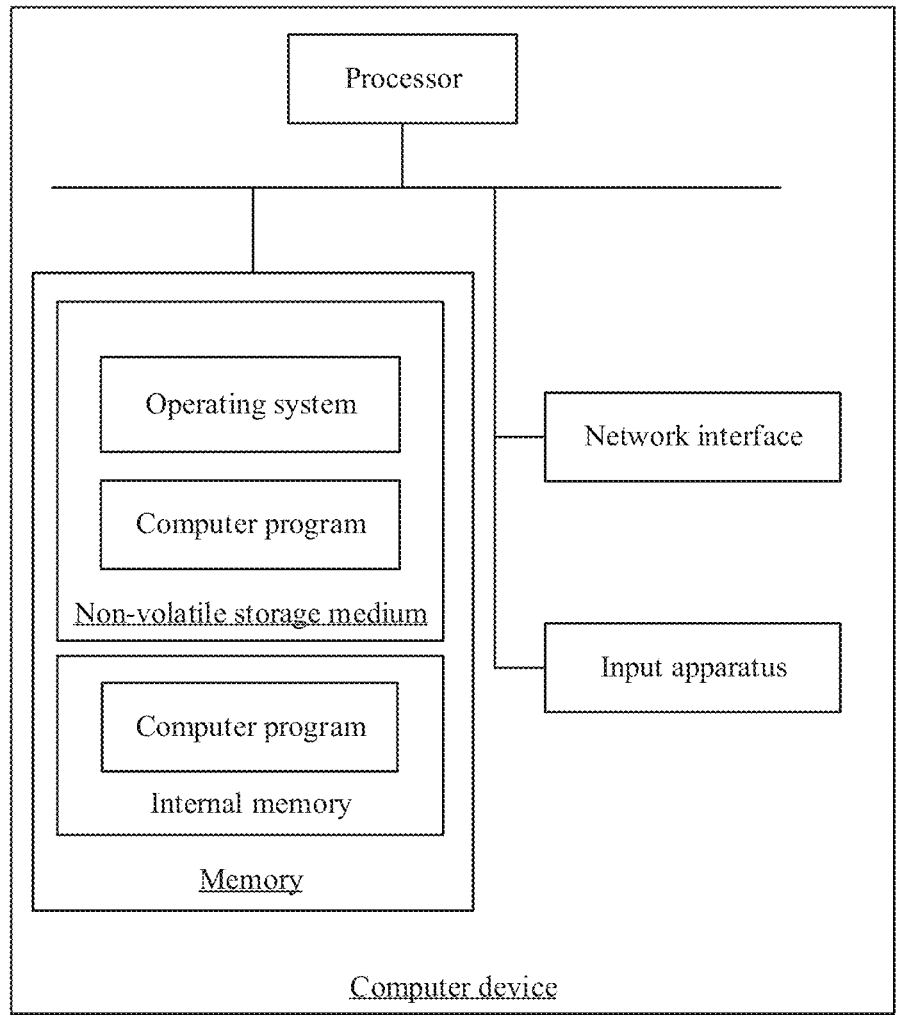
FIG. 13 is a block diagram of an internal structure of a computer device according to an embodiment.

FIG. 13 is a diagram of an internal structure of a computer device according to an embodiment. The computer device may be specifically the authentication center in FIG. 1. As shown in FIG. 13, the computer device includes a processor, a memory, a network interface, and an input apparatus that are connected by a system bus. The memory includes a non-volatile storage medium and an internal memory. The non-volatile storage medium of the computer device stores an operating system and may further store a computer program, the computer program, when executed by the processor, causing the processor to implement the digital certificate verification method. The internal memory may also store a computer program, the computer program, when executed by the processor, causing the processor to perform the digital certificate verification method. The input apparatus of the computer device may be a touch layer covering the display screen, or may be a button, a trackball or a touch panel disposed on a housing of the computer device, or may be an external keyboard, touch panel or mouse.

A person skilled in the art may understand that, the structure shown in FIG. 13 is only a block diagram of a partial structure related to the solution in this application, and does not limit the computer device to which the solution of this application is applied. Specifically, the computer device may include more components or fewer components than those shown in the figure, or some components may be combined, or a different component deployment may be used.

In one embodiment, the digital certificate verification apparatus provided in this application may be implemented in the form of a computer program. The computer program may be run on the computer device shown in FIG. 13. The memory of the computer device may store program modules forming the digital certificate verification apparatus, for example, the verification request receiving module 1002, the target transaction record obtaining module 1004, the target account type obtaining module 1006, and the verification result determination module 1008 shown in FIG. 10. A computer program formed by the program modules causes the processor to perform the steps in the digital certificate verification method in the embodiments of this application described in this specification.

For example, the computer device shown in FIG. 13 may receive, by using the verification request receiving module 1002 in the digital certificate verification apparatus shown in FIG. 10, a verification request for verifying a target digital certificate; obtain a target transaction record corresponding to the target digital certificate from a blockchain by using the target transaction record obtaining module 1004, the target digital certificate being stored in the blockchain as a transaction resource; obtain a target account type corresponding to the target transaction record by using the target account type obtaining module 1006, different account types corresponding to different certificate operation states; and determine a verification result corresponding to the target digital certificate according to the target account type by using the verification result determination module 1008.

In one embodiment, a computer device is provided. The computer device includes a memory, a processor, and a computer program that is stored in the memory and is capable of being run on the processor, the computer program, when executed by the processor, implementing the following steps: receiving a verification request for verifying a target digital certificate; obtaining a target transaction record corresponding to the target digital certificate from a blockchain, the target digital certificate being stored in the blockchain as a transaction resource; obtaining a target account type corresponding to the target transaction record, different account types corresponding to different certificate operation states; and determining a verification result corresponding to the target digital certificate according to the target account type.

In one embodiment, the computer program further causes the processor to perform the following steps: receiving an operation request for operating the target digital certificate; determining a target recipient account type corresponding to the target digital certificate according to an operation type of the operation request; and generating a certificate transaction record corresponding to the operation request, and writing the certificate transaction record into the blockchain, a transaction resource in the certificate transaction record being the target digital certificate, a recipient account in the certificate transaction record being an account corresponding to the target recipient account type.

In one embodiment, the determining a target recipient account type corresponding to the target digital certificate according to an operation type of the operation request that is performed by the processor includes: determining that the target recipient account type is a certificate issuing account type if the operation type corresponding to the operation request is an update operation type or an insertion operation type.

In one embodiment, the determining a target recipient account type corresponding to the target digital certificate according to an operation type of the operation request that is performed by the processor includes: determining that the target recipient account type is a certificate recovery account type if the operation type corresponding to the operation request is a revocation operation type.

In one embodiment, the target transaction record is a latest transaction record; the obtaining a target account type corresponding to the target transaction record that is performed by the processor includes: obtaining a current recipient account type as the target account type, the current recipient account type corresponding to the latest transaction record and belonging to an account receiving the target digital certificate; and the determining a verification result corresponding to the target digital certificate according to the target account type that is performed by the processor includes: determining, if the current recipient account type is a certificate issuing account type, that the verification result corresponding to the target digital certificate is that the verification succeeds.

In one embodiment, the target transaction record is the latest transaction record, and the obtaining a target account type corresponding to the target transaction record that is performed by the processor includes: obtaining a current recipient account type as the target account type, the current recipient account type corresponding to the latest transaction record and belonging to an account receiving the target digital certificate; and the determining a verification result corresponding to the target digital certificate according to the target account type that is performed by the processor includes: determining, if the current recipient account type is a certificate recovery account type, that the verification result corresponding to the target digital certificate is that the verification fails.

In one embodiment, the verification request carries a transaction identifier corresponding to the target digital certificate, and the obtaining a target transaction record corresponding to the target digital certificate from a blockchain that is performed by the processor includes: obtaining a transaction chain corresponding to the target digital certificate according to the transaction identifier, and using a transaction record at the end of the transaction chain as the latest transaction record, transaction records in the transaction chain being sequentially arranged in transaction order.

In one embodiment, the computer program further causes the processor to perform the following steps: obtaining a root certificate corresponding to the target digital certificate from the blockchain according to the verification request; verifying the target digital certificate according to the root certificate to obtain a root verification result; and determining, if the root verification fails, that the verification result corresponding to the target digital certificate is that the verification fails, or if the root verification succeeds, performing the operation of obtaining a target transaction record corresponding to the target digital certificate from a blockchain.

In one embodiment, a computer-readable storage medium is provided. The computer-readable storage medium stores a computer-readable storage medium, the computer program, when executed by a processor, causing the processor to perform the following steps: receiving a verification request for verifying a target digital certificate; obtaining a target transaction record corresponding to the target digital certificate from a blockchain, the target digital certificate being stored in the blockchain as a transaction resource; obtaining a target account type corresponding to the target transaction record, different account types corresponding to different certificate operation states; and determining a verification result corresponding to the target digital certificate according to the target account type.

In one embodiment, the computer program further causes the processor to perform the following steps: receiving an operation request for operating the target digital certificate; determining a target recipient account type corresponding to the target digital certificate according to an operation type of the operation request; and generating a certificate transaction record corresponding to the operation request, and writing the certificate transaction record into the blockchain, a transaction resource in the certificate transaction record being the target digital certificate, a recipient account in the certificate transaction record being an account corresponding to the target recipient account type.

In one embodiment, the determining a target recipient account type corresponding to the target digital certificate according to an operation type of the operation request that is performed by the processor includes: determining that the target recipient account type is a certificate issuing account type if the operation type corresponding to the operation request is an update operation type or an insertion operation type.

In one embodiment, the determining a target recipient account type corresponding to the target digital certificate according to an operation type of the operation request that is performed by the processor includes: determining that the target recipient account type is a certificate recovery account type if the operation type corresponding to the operation request is a revocation operation type.

In one embodiment, the target transaction record is a latest transaction record; the obtaining a target account type corresponding to the target transaction record that is performed by the processor includes: obtaining a current recipient account type as the target account type, the current recipient account type corresponding to the latest transaction record and belonging to an account receiving the target digital certificate; and the determining a verification result corresponding to the target digital certificate according to the target account type that is performed by the processor includes: determining, if the current recipient account type is a certificate issuing account type, that the verification result corresponding to the target digital certificate is that the verification succeeds.

In one embodiment, the target transaction record is the latest transaction record, and the obtaining a target account type corresponding to the target transaction record that is performed by the processor includes: obtaining a current recipient account type as the target account type, the current recipient account type corresponding to the latest transaction record and belonging to an account receiving the target digital certificate; and the determining a verification result corresponding to the target digital certificate according to the target account type that is performed by the processor includes: determining, if the current recipient account type is a certificate recovery account type, that the verification result corresponding to the target digital certificate is that the verification fails.

In one embodiment, the verification request carries a transaction identifier corresponding to the target digital certificate, and the obtaining a target transaction record corresponding to the target digital certificate from a blockchain that is performed by the processor includes: obtaining a transaction chain corresponding to the target digital certificate according to the transaction identifier, and using a transaction record at the end of the transaction chain as the latest transaction record, transaction records in the transaction chain being sequentially arranged in transaction order.

In one embodiment, the computer program further causes the processor to perform the following steps: obtaining a root certificate corresponding to the target digital certificate from the blockchain according to the verification request; verifying the target digital certificate according to the root certificate to obtain a root verification result; and determining, if the root verification fails, that the verification result corresponding to the target digital certificate is that the verification fails, or if the root verification succeeds, performing the operation of obtaining a target transaction record corresponding to the target digital certificate from a blockchain.

It is to be understood that although the steps in the flowcharts of the embodiments of this application are displayed in sequence according to arrows, the steps are not necessarily performed in the sequence indicated by the arrows. Unless explicitly specified in this specification, the sequence for performing the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed in turn or alternately with other steps or at least some of sub-steps or stages of other steps.

A person of ordinary skill in the art may understand that all or some of the procedures of the methods in the foregoing embodiments may be implemented by a computer program instructing relevant hardware. The program may be stored in a non-volatile computer-readable storage medium. When the program is executed, the procedures of the foregoing method embodiments may be performed. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDRS-DRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. For concise description, not all possible combinations of the technical features in the embodiment are described. However, the combinations of the technical features are to be considered as falling within the scope recorded in this specification provided that they do not conflict with each other.

Only several implementations of this application are described in the foregoing embodiments, and are described in detail, but they are not to be construed as a limitation to the patent scope of this application. A person of ordinary skill in the art may further make variations and improvements without departing from the ideas of this application, which shall fall within the protection scope of this application. Therefore, the protection scope of the patent of this application is to be subject to the appended claims.

What is claimed is:

1. A digital certificate verification method, performed by an authentication center, the method comprising:
receiving a verification request for verifying a target digital certificate;
obtaining a target transaction record of a target transaction corresponding to the target digital certificate from a blockchain, wherein the target digital certificate is a transaction resource stored in the blockchain, and the target digital certificate itself is transacted between accounts, wherein a transaction record of the target digital certificate is configured to record a successful transaction occurred on the target digital certificate and includes a transfer-from account indicating a source where the target digital certificate is transferred from, and a recipient account indicating a destination where the target digital certificate is transferred to, and the target transaction record is a latest transaction record of the target digital;
obtaining an account number of the recipient account recorded in the latest transaction record, wherein the recipient account recorded in the latest transaction record is an account that receives the target digital certificate as a result of the target transaction and is a transaction output of the target transaction;
determining a target account type of the recipient account of the latest transaction record according to the account number of the recipient account and correspondences between account types and account numbers of accounts in the blockchain, wherein the account types of accounts include a certificate recovery account type indicating a revoked state and a certificate issuing account type indicating an issued state; and determining a verification result corresponding to the target digital certificate according to the target account type, including:
  in response to the target account type being the certificate issuing account type, determining that a verification of the target digital certificate succeeds; and
  in response to the target account type being the certificate recovery account type, determining that the verification of the target digital certificate fails,
wherein prior to obtaining the transaction record, the method further comprises:
  obtaining a root certificate corresponding to the target digital certificate from the blockchain according to the verification request, the root certificate being stored in a genesis block of the blockchain;
  verifying the target digital certificate according to the root certificate to obtain a root verification result;
  determining, if the root verification fails, that the verification result corresponding to the target digital certificate is that the verification fails without obtaining the target transaction record; and
  performing the obtaining of the target transaction record of the target digital certificate from the blockchain if the root verification succeeds;
wherein prior to receiving the verification request, the method further comprises:
receiving a digital certificate generation request transmitted by a certificate application node and carrying identity certification information;
in response to the digital certificate generation request, transmitting the identity certification information to a plurality of consensus authentication centers;
receiving certification results obtained through authentication by at least one of the plurality of consensus authentication centers according to the identity certification information broadcasted through all consensus authentication centers;
determining an identity certification result corresponding to the certificate application node for the digital certificate generation request based on a first quantity of consensus authentication centers whose certification results are that the authentication succeeds,
in response to the identity certification result corresponding to the digital certificate generation request indicating that the identity certification succeeds, writing the target digital certificate as a transaction resource into the blockchain and storing the transaction record of the target digital certificate in the blockchain for the first time, the transfer-from account of any target digital certificate stored in the transaction record being a same preset account having a same preset character string and indicating that the transaction resource of the target digital certificate is an initial transaction resource.

2. The method according to claim 1, further comprising: prior to receiving the verification request, generating the latest transaction record of the target digital certificate, including:
  receiving an operation request for operating the target digital certificate;
  determining a target recipient account type corresponding to the target digital certificate according to an operation type of the operation request; and
  generating the latest certificate transaction record of the target digital certificate corresponding to the operation request, and writing the certificate transaction record into the blockchain, a transaction resource in the latest certificate transaction record being the target digital certificate, a recipient account in the certificate transaction record being an account corresponding to the target recipient account type.

3. The method according to claim 2, wherein the determining a target recipient account type corresponding to the target digital certificate according to an operation type of the operation request comprises:
  determining that the target recipient account type is the certificate issuing account type if the operation type corresponding to the operation request is an update operation type or an insertion operation type.

4. The method according to claim 2, wherein the determining a target recipient account type corresponding to the target digital certificate according to an operation type of the operation request comprises:
  determining that the target recipient account type is the certificate recovery account type if the operation type corresponding to the operation request is a revocation operation type.

5. The method according to claim 1, wherein the verification request carries a transaction identifier corresponding to the target digital certificate, and the obtaining a target transaction record of the target digital certificate from a blockchain comprises:
  obtaining a transaction chain corresponding to the target digital certificate according to the transaction identifier, and identifying a transaction record at an end of the transaction chain as the latest transaction record, transaction records in the transaction chain being sequentially arranged in a transaction order.

6. The method according to claim 1, wherein the recipient account is an account with a certificate authority (CA).

7. The method according to claim 1, wherein the target transaction is an unspent transaction output (UTXO) transaction.

8. The method according to claim 1, wherein the correspondences between the account types and the account numbers are preset.

9. The method according to claim 1, wherein the identity certification result indicates that the identity certification succeeds in response to at least one of the following conditions is met:
  the first quantity is greater than a second quantity of consensus authentication centers whose certification results are that the authentication fails,
  the first quantity reaches a first preset threshold,
  a ratio of the first quantity to a quantity of the authentication centers participating in the consensus verification reaches a second preset threshold, or
  a ratio of the first quantity to a quantity of nodes of the blockchain reaches a third preset threshold.

10. The method according to claim 1, wherein: the certification results of consensus authentication centers are obtained based on practical Byzantine fault tolerance (PBFT) consensus process.

11. A computer device, comprising a memory and a processor, the memory storing a computer program, the computer program, when executed by the processor, causing the processor to perform:
  receiving a verification request for verifying a target digital certificate;
  wherein the target digital certificate is a transaction resource stored in the blockchain, and the target digital certificate itself is transacted between accounts, wherein a transaction record of the target digital certificate is configured to record a successful transaction occurred on the target digital certificate and includes a transfer-from account indicating a source where the target digital certificate is transferred from, and a recipient account indicating a destination where the target digital certificate is transferred to, and the target transaction record is a latest transaction record of the target digital certificate;

obtaining an account number of the recipient account recorded in the latest transaction record, wherein the recipient account recorded in the latest transaction record is an account that receives the target digital certificate as a result of the target transaction and is a transaction output of the target transaction;

determining a target account type of the recipient account of the latest transaction record according to the account number of the recipient account and correspondences between account types and account numbers of accounts in the blockchain, wherein the account types of accounts include a certificate recovery account type indicating a revoked state and a certificate issuing account type indicating an issued state; and determining a verification result corresponding to the target digital certificate according to the target account type, including:
 in response to the target account type being the certificate issuing account type, determining that a verification of the target digital certificate succeeds; and
 in response to the target account type being the certificate recovery account type, determining that the verification of the target digital certificate fails, wherein prior to obtaining the transaction record, the method further comprises:
 obtaining a root certificate corresponding to the target digital certificate from the blockchain according to the verification request, the root certificate being stored in a genesis block of the blockchain;
 verifying the target digital certificate according to the root certificate to obtain a root verification result;
 determining, if the root verification fails, that the verification result corresponding to the target digital certificate is that the verification fails without obtaining the target transaction record; and
 performing the obtaining of the target transaction record of the target digital certificate from the blockchain if the root verification succeeds;

wherein prior to receiving the verification request, the method further comprises:
receiving a digital certificate generation request transmitted by a certificate application node and carrying identity certification information;
in response to the digital certificate generation request, transmitting the identity certification information to a plurality of consensus authentication centers;
receiving certification results obtained through authentication by at least one of the plurality of consensus authentication centers according to the identity certification information broadcasted through all consensus authentication centers;
determining an identity certification result corresponding to the certificate application node based on a first quantity of consensus authentication centers whose certification results are that the authentication succeeds,
in response to the identity certification result corresponding to the digital certificate generation request indicating that the identity certification succeeds, writing the target digital certificate as a transaction resource into the blockchain and storing the transaction record of the target digital certificate in the blockchain for the first time, the transfer-from account of any target digital certificate stored in the transaction record being a same preset account having a same preset character string and indicating that the transaction resource of the target digital certificate is an initial transaction resource.

12. The computer device according to claim 11, wherein the processor is further configured to perform: prior to receiving the verification request, generating the latest transaction record of the target digital certificate, including:
 receiving an operation request for operating the target digital certificate;
 determining a target recipient account type corresponding to the target digital certificate according to an operation type of the operation request; and
 generating the latest certificate transaction record of the target digital certificate corresponding to the operation request, and writing the certificate transaction record into the blockchain, a transaction resource in the latest certificate transaction record being the target digital certificate, a recipient account in the certificate transaction record being an account corresponding to the target recipient account type.

13. The computer device according to claim 12, wherein the determining a target recipient account type corresponding to the target digital certificate according to an operation type of the operation request comprises:
 determining that the target recipient account type is the certificate issuing account type if the operation type corresponding to the operation request is an update operation type or an insertion operation type.

14. The computer device according to claim 12, wherein the determining a target recipient account type corresponding to the target digital certificate according to an operation type of the operation request comprises:
 determining that the target recipient account type is the certificate recovery account type if the operation type corresponding to the operation request is a revocation operation type.

15. The computer device according to claim 11, wherein the verification request carries a transaction identifier corresponding to the target digital certificate, and the obtaining a target transaction record corresponding to the target digital certificate from a blockchain comprises:
 obtaining a transaction chain corresponding to the target digital certificate according to the transaction identifier, and identifying a transaction record at an end of the transaction chain as the latest transaction record, transaction records in the transaction chain being sequentially arranged in a transaction order.

16. A non-transitory computer-readable storage medium, storing a computer program, the computer program, when executed by a processor, causing the processor to perform:
 receiving a verification request for verifying a target digital certificate;
 wherein the target digital certificate is a transaction resource stored in the blockchain, and the target digital certificate itself is transacted between accounts, wherein a transaction record of the target digital certificate is configured to record a successful transaction occurred on the target digital certificate and includes a transfer-from account indicating a source where the target digital certificate is transferred from, and a recipient account indicating a destination where the target digital certificate is transferred to, and the target transaction record is a latest transaction record of the target digital certificate;

obtaining an account number of the recipient account recorded in the latest transaction record, wherein the recipient account recorded in the latest transaction record is an account that receives the target digital certificate as a result of the target transaction and is a transaction output of the target transaction;

determining a target account type of the recipient account of the latest transaction record according to the account number of the recipient account and correspondences between account types and account numbers of accounts in the blockchain, wherein the account types of accounts include a certificate recovery account type indicating a revoked state and a certificate issuing account type indicating an issued state; and determining a verification result corresponding to the target digital certificate according to the target account type, including:

in response to the target account type being the certificate issuing account type, determining that a verification of the target digital certificate succeeds; and in response to the target account type being the certificate recovery account type, determining that the verification of the target digital certificate fails, wherein prior to obtaining the transaction record, the method further comprises:

obtaining a root certificate corresponding to the target digital certificate from the blockchain according to the verification request, the root certificate being stored in a genesis block of the blockchain;

verifying the target digital certificate according to the root certificate to obtain a root verification result;

determining, if the root verification fails, that the verification result corresponding to the target digital certificate is that the verification fails without obtaining the target transaction record; and performing the obtaining of the target transaction record of the target digital certificate from the blockchain if the root verification succeeds;

wherein prior to receiving the verification request, the method further comprises:

receiving a digital certificate generation request transmitted by a certificate application node and carrying identity certification information;

in response to the digital certificate generation request, transmitting the identity certification information to a plurality of consensus authentication centers;

receiving certification results obtained through authentication by at least one of the plurality of consensus authentication centers according to the identity certification information broadcasted through all consensus authentication centers;

determining an identity certification result corresponding to the certificate application node based on a first quantity of consensus authentication centers whose certification results are that the authentication succeeds, in response to the identity certification result corresponding to the digital certificate generation request indicating that the identity certification succeeds, writing the target digital certificate as a transaction resource into the blockchain and storing the transaction record of the target digital certificate in the blockchain for the first time, the transfer-from account of any target digital certificate stored in the transaction record being a same preset account having a same preset character string and indicating that the transaction resource of the target digital certificate is an initial transaction resource.

17. The storage medium according to claim 16, wherein the computer program further cause the processors to perform: prior to receiving the verification request, generating the latest transaction record of the target digital certificate, including:

receiving an operation request for operating the target digital certificate;

determining a target recipient account type corresponding to the target digital certificate according to an operation type of the operation request; and generating the latest certificate transaction record of the target digital certificate corresponding to the operation request, and writing the certificate transaction record into the blockchain, a transaction resource in the latest certificate transaction record being the target digital certificate, a recipient account in the certificate transaction record being an account corresponding to the target recipient account type.

18. The storage medium according to claim 17, wherein the determining a target recipient account type corresponding to the target digital certificate according to an operation type of the operation request comprises:

determining that the target recipient account type is the certificate issuing account type if the operation type corresponding to the operation request is an update operation type or an insertion operation type.

19. The storage medium according to claim 17, wherein the determining a target recipient account type corresponding to the target digital certificate according to an operation type of the operation request comprises:

determining that the target recipient account type is the certificate recovery account type if the operation type corresponding to the operation request is a revocation operation type.

* * * * *